United States Patent [19]
Patton et al.

[11] Patent Number: 5,694,634
[45] Date of Patent: Dec. 2, 1997

[54] METHOD FOR COMMUNICATING SCENE ORIENTATION OF CAMERA FILM TO PHOTO FINISHING EQUIPMENT

[75] Inventors: David Lynn Patton, Webster; Stephen John Rowan, Spencerport; Joseph Anthony Manico, Rochester, all of N.Y.

[73] Assignee: Eastman Kodak Company, Rochester, N.Y.

[21] Appl. No.: 664,465

[22] Filed: Jun. 14, 1996

Related U.S. Application Data

[63] Continuation-in-part of Ser. No. 369,942, Jan. 9, 1995, Pat. No. 5,530,517.

[51] Int. Cl.⁶ .......................... G03D 13/00; G03B 27/52
[52] U.S. Cl. .................. 396/567; 396/639; 355/40; 355/77
[58] Field of Search ........................ 396/612, 312, 396/311, 567, 639; 355/27–29, 40, 41, 77

[56] References Cited

U.S. PATENT DOCUMENTS

| | | | |
|---|---|---|---|
| 4,403,854 | 9/1983 | van Stein et al. | 355/41 |
| 4,541,028 | 9/1985 | Johnson | 360/137 |
| 4,574,692 | 3/1986 | Wahli | 355/40 |
| 4,659,213 | 4/1987 | Matsumoto | 355/38 |
| 4,791,741 | 12/1988 | Kondo | 40/124.1 |
| 4,800,406 | 1/1989 | Signoretto | 355/40 |
| 4,821,061 | 4/1989 | Gudmundson et al. | 355/40 |
| 5,032,707 | 7/1991 | Gudmundson et al. | 355/40 |
| 5,045,327 | 9/1991 | Tarlow et al. | 381/51 |
| 5,122,832 | 6/1992 | Iwashita et al. | 355/41 |
| 5,159,385 | 10/1992 | Imamura | 355/28 |
| 5,241,166 | 8/1993 | Chandler | 235/494 |
| 5,248,887 | 9/1993 | Oberhardt | 355/41 |
| 5,301,036 | 4/1994 | Barrett et al. | 358/448 |
| 5,313,235 | 5/1994 | Inoue et al. | 40/455 |
| 5,365,686 | 11/1994 | Scott | 40/455 |
| 5,433,035 | 7/1995 | Bauer | 40/124.1 |
| 5,450,149 | 9/1995 | Cocca | 354/106 |
| 5,488,049 | 1/1996 | Shater et al. | 235/462 |
| 5,574,519 | 11/1996 | Manico et al. | 396/429 |

Primary Examiner—D. Rutledge
Attorney, Agent, or Firm—Cumpston & Shaw, P.C.

[57] ABSTRACT

A method is described for communicating printing instructions on exposed photographic film to photo finishing equipment to enable imaging parameters to be set automatically which includes the steps of splicing a first exposed strip of film to a second exposed strip of film with a film-splicing label, encoding the label with low resolution indicia, and feeding the spliced first and second films to a film-splicing label reader for reading the code and automatically setting the parameters for printing. A film-splicing label encoded with indicia for identifying the scene orientation, the number of prints and/or whether sound is to be provided.

9 Claims, 7 Drawing Sheets

| LEFT | RIGHT | |
|---|---|---|
| NO | DOTS | NO DOTS IS THE DEFAULT VALUE WHICH CAN BE SET AT ONE OR TWO PRINTS EACH. |
| ▦ | | ONE DOT IN THE LEFT SPACE IS TWO PRINTS EACH. |
| | ▦ | ONE DOT IN THE RIGHT SPACE IS THREE PRINTS EACH. |
| ▦ | ▦ | ONE DOT IN EACH POSITION MEANS SCENE INVERSION. |

FIG. 3

| LEFT | RIGHT | |
|---|---|---|
| NO | DOTS | NO DOTS IS THE DEFAULT VALUE WHICH CAN BE SET AT ONE OR TWO PRINTS EACH. |
| ▦ | | ONE DOT IN THE LEFT SPACE IS TWO PRINTS EACH. |
| | ▦ | ONE DOT IN THE RIGHT SPACE IS SCENE INVERSION ONE EACH. |
| ▦ | ▦ | ONE DOT IN EACH POSITION IS SCENE INVERSION TWO EACH. |

FIG. 4

| LEFT | RIGHT | |
|---|---|---|
| NO | DOTS | NO DOTS IS THE DEFAULT VALUE WHICH CAN BE SET AT ONE OR TWO PRINTS EACH. |
| ▦ | | ONE DOT IN THE LEFT SPACE IS ONE PRINT EACH. |
| | ▦ | ONE DOT IN THE RIGHT SPACE IS THREE PRINTS EACH. |
| ▦ | ▦ | ONE DOT IN EACH POSITION MEANS SCENE INVERSION. |

| | |
|---|---|
|  | NO DOTS IS THE DEFAULT VALUE WHICH CAN BE SET AT ONE OR TWO PRINTS EACH, NO SOUND. |
|  | ONE DOT IN THE LEFT SPACE IS ONE SOUND PRINT EACH. |
|  | ONE DOT IN THE RIGHT SPACE IS TWO SOUND PRINTS EACH. |
|  | ONE DOT IN EACH SPACE IS ONE SOUND PRINT AND ONE PRINT WITHOUT SOUND. |

FIG. 7

| | |
|---|---|
|  | NO DOTS IS THE DEFAULT VALUE WHICH CAN BE SET AT ONE OR TWO PRINTS EACH, NO SOUND AND THE SCENE IS NOT INVERTED. |
|  | ONE DOT IN THE LEFT SPACE IS ONE SOUND PRINT EACH, SCENE NOT INVERTED. |
|  | ONE DOT IN THE RIGHT SPACE IS ONE SOUND PRINT EACH, SCENE INVERTED. |
|  | ONE DOT IN EACH SPACE IS NO SOUND, SCENE INVERTED. |

| | Description |
|---|---|
| SOUND = DOT / SOUND = NO DOT / SCENE INVERTED = DOT / ONE PRINT EACH = NO DOT / TWO PRINTS EACH = DOT | |
| ▢ ▢ ▢ (dashed) | NO DOTS IS THE DEFAULT VALUE, ONE PRINT EACH, NO SOUND AND THE SCENE IS NOT INVERTED. |
| ■ | ONE DOT IN THE LEFT SPACE IS ONE SOUND PRINT EACH, SCENE NOT INVERTED. |
| ■ (middle) | ONE DOT IN THE MIDDLE SPACE IS NO SOUND PRINT, SCENE IS INVERTED, ONE PRINT EACH. |
| ■ (right) | ONE DOT IN THE RIGHT SPACE IS NO SOUND PRINT, SCENE IS NOT INVERTED, TWO PRINTS EACH. |
| ■ ■ (left, middle) | ONE DOT IN THE LEFT AND MIDDLE SPACES IS ONE SOUND PRINT, SCENE IS INVERTED, AND ONE PRINT EACH. |
| ■ ■ (middle, right) | ONE DOT IN THE MIDDLE AND RIGHT SPACES IS NO SOUND, SCENE IS INVERTED, AND TWO PRINTS EACH. |
| ■ ■ (left, right) | ONE DOT IN THE LEFT AND RIGHT SPACES IS TWO SOUND PRINTS AND SCENE IS NOT INVERTED. |
| ■ ■ ■ | ONE DOT IN EACH OF THE SPACES IS TWO SOUND PRINTS EACH AND THE SCENE IS INVERTED. |

METHOD FOR COMMUNICATING SCENE ORIENTATION OF CAMERA FILM TO PHOTO FINISHING EQUIPMENT

CROSS-REFERENCE TO RELATED APPLICATIONS

This is a continuation-in-part of application Ser. No. 08/369,942, filed Jan. 9, 1995, now U. S. Pat. No. 5,530,517, entitled "Method for Communicating Scene Orientation of Camera Film to Photo Finishing Equipment", by David L. Patton, Stephen J. Rowan, and Joseph A. Manico.

FIELD OF INVENTION

This invention related generally to the field of image processing, and more particularly to a method for communicating the information such as scene orientation of an exposed strip of photographic film, number of prints ordered and/or whether sound is to be provided to photo finishing equipment with a film-splicing label having label encoded information imprinted thereon.

BACKGROUND OF THE INVENTION

When film is exposed in a conventional camera it is normally advanced from left to right. A film magazine can be loaded on the left hand side and wound in the normal wind direction, i.e. the first or lowest numbered frame is exposed first and the film is returned back into the magazine, after all the pictures are taken, or it can be wound in the reverse wind direction, in which the film is first extracted out of the magazine and returned to the magazine as each picture is taken, i.e. the first frame on which a picture is taken is the first frame wound onto the magazine and corresponds to the highest numbered frame. The film magazine may also be loaded on the right hand side of a camera and either normal wind or reverse wind film transport techniques may be used. Cameras which utilize right hand load and a reverse wind technique include the increasingly popular single use cameras (SUC's) where it is more economical and reliable to put the magazine on the right side and thus eliminate the rewinding mechanism. A right hand load camera causes the scene on the film to be inverted when it is printed by an optical printer because, by convention, the printer receives the lowest numbered end of the film first and prints from the lowest frame number on the film to the highest frame number.

As the film is advanced into the print gate of the printer, the negative is first scanned for classification. However, the printer has no way to detect if the scene is an inverted or normal scene. The knowledge of the image orientation of a scene has application for conventional optical printing since this information is critical to the exposure determining algorithms in the printer software. Automatic digital imaging applications, such as the production of compact discs containing photographic images, and index prints on such discs, digitally printed automatic album pages, etc., also require that the images be correctly oriented before the final output image format is generated. At present, the scene inversion information is normally manually inputted to the printer setup values and remains fixed until the operator changes it. If this value is set to the normal scene orientation setting, then all film is treated in like manner, even if it is right hand load. Therefore, the best exposure will not be given to right hand load film. It is desirable to provide a means to detect and automatically tell the printer if a roll of film is a left or right (inverted) hand load film so that the required algorithms in the printer software can be activated, and the images can be printed right side up for conventional prints or digital and other multi image media.

Normally photo finishing operators sort customer films into batches of similar film for processing. It is not usually possible for the operator to identify the scene orientation of film from a reloadable camera. However, when the film is from a single use camera it is readily identified because the camera itself is opened by the photo finisher to retrieve the magazine and thus the right hand load film can be separated from other film. Once the film is identified as right hand load film by the photo finisher the printer can be signaled accordingly. This is a slow and therefore costly procedure when done by hand for multiple rolls of film.

Photo finishing operator also like to set up the equipment for the most efficient operation. In this regard is often desirable to know what additional operations are required to be associated with the prints. U.S. Pat. No. 4,974,096 disclosed film having a thin magnetic layer upon which magnetic information may be recorded. This information can be sound obtained when the images were initially photographed or can be sound flags record by the camera. These sound flags would be representative of particular sounds to be associated with the image. If these sound are to be associated with prints that to be made from the film, it is very desirable for the photofinisher to know this so that the equipment can be set up appropriately or the prints properly routed and collated with any sound devices to be associated with the images.

U.S. Pat. No. 4,659,213 discloses a method and apparatus for detecting image information which has been recorded on the marginal portion of a film negative sheet outside of the film image. The marginal information, such as bar codes, may be used during photographic printing so as to discriminate the front surface from the back surface and/or to discriminate the top edge of the film from the bottom edge. If the negative film is mounted in an inverse direction, the printing exposure amount and correction may be determined.

SUC's use normal film which can be readily identified as right hand load and sorted manually. There is a need for a way in which normal film, exposed in either left or right hand load cameras, can be encoded as to orientation and processed in existing photo finishing equipment at high speed and therefore at low cost.

U.S. Pat. No. 4,800,406 discloses a method and apparatus for creating and checking correlation between negatives and prints in photographic laboratories by joining adjacent pairs of filmstrips with splicing tapes bearing machine-readable control numbers that are unrelated to orientation and reproducing each of said numbers onto the print medium at the printing station.

U.S. Pat. No. 5,248,887 discloses a method and apparatus for determining the orientation of film by providing the strip of exposed film with a timing track along one of the longitudinal margins thereof. The track includes a sequence of three segments. A sensor detects the position and width of the segments to determine the orientation of the film and thus distinguishes that the emulsion side is correctly oriented and whether the first or last exposure was inserted as the leading end. Using suitable printers an incorrectly oriented film can be detected and inverted electronically so that the image can be printed with the correct orientation.

While the foregoing patents '213 and '887 describe a way in which to detect orientation of a filmstrip by using specially coded filmstrip and apparatus designed to detect such codes, they require special film and increase the complexity of film processing and, therefore, increase the cost of making prints.

In the present application, the term "imaging" is used as a blanket term for techniques used to convert an image on a film into a format for viewing, such as optical printing or digital scanning for printing, video displaying or projecting. The term "imaging parameters" is used as a blanket term for those variables which can be set for photofinishing equipment in order to produce a viewable image, such as scene orientation, subject classification, exposure determination and color, density and contrast determinations.

SUMMARY OF THE INVENTION

Briefly stated, and in accordance with one aspect of the invention, a method for communicating two process order features to photofinishing equipment to enable two feature parameters to be performed automatically by the photofinishing equipment, comprising the steps of:

splicing the trailing end of a first exposed ship of film to the leading end of a second exposed strip of film with a film-splicing label; and encoding said film-splicing label with a code for two order features that are to be performed with respect to one of said exposed strip of photographic film.

In accordance with another aspect of this invention, the method comprises encoding the label with print count information and automatically setting for communicating the requirements for the addition of sound to photofinishing equipment to enable the photo finishing equipment to add sound to developed prints, comprising the steps of:

splicing the trailing end of a first exposed strip of film to the leading end of a second exposed strip of film with a film-splicing label; and encoding said film-splicing label with a code for signifying the addition of sound to prints made from the exposed film.

The novel aspects of this invention are set forth with particularity in the appended claims. The invention itself, together with further objects and advantages thereof may be more fully comprehended by reference to the following detailed description of a presently preferred embodiment of the invention taken in conjunction with the accompanying drawings.

DETAILED DESCRIPTION OF THE INVENTION

Although different film size cameras can incorporate the methods and apparatus of this invention, the invention is disclosed as being embodied preferably as encoding film loaded in a magazine (cassette) for use with a 35 mm still camera. Because such a film and camera are well known, this description is directed in particular to photographic elements forming part of or cooperating directly with the disclosed embodiment. In a preferred embodiment of the invention the encoding method is described for use with single use cameras with the normal 35 mm format. However, such cameras using panoramic or telephoto formats and waterproof camera versions and cameras using other film sizes also fall within the invention. In the preferred embodiment the film is advanced from left to right in the conventional manner. It is to be understood, however, that the encoding method is readily adaptable for cameras in which the film is advanced from right to left, and that other elements not specifically shown or described may take various forms known to persons of ordinary skill in the art.

Figure 1:
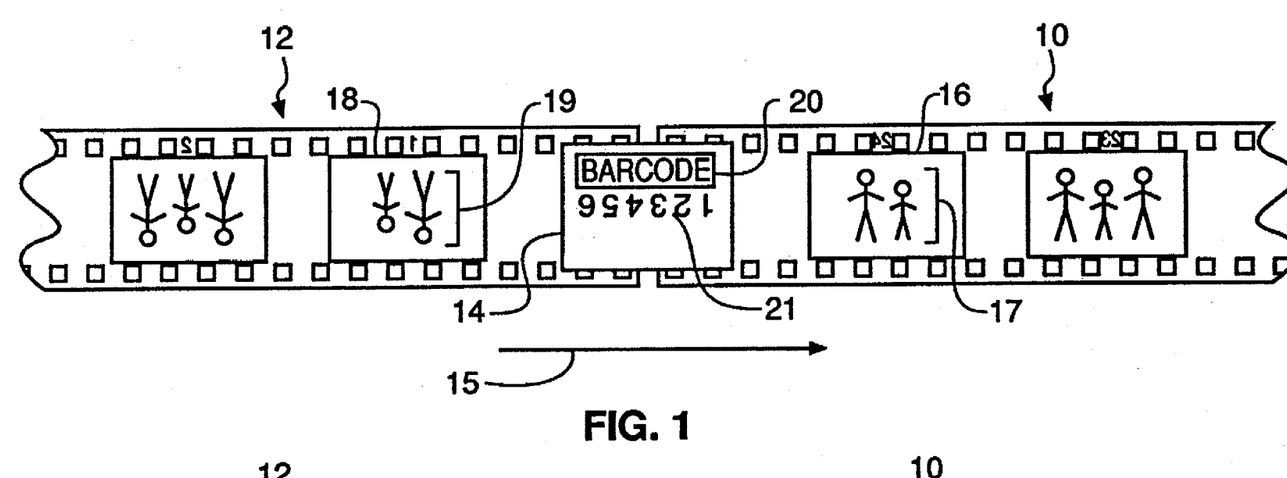
FIG. 1 illustrates an example of adjacent left and right hand load film strips spliced together with an encoded film-splicing label.

Referring to FIG. 1, an exposed strip of a first film 10, a left hand load film, is shown spliced to an exposed strip of a second film 12, a right hand load film, by means of a film-splicing label 14. Both films are viewed with the emulsion side up and the splicing label 14 is mounted on the emulsion side of the films. The spliced films are fed to photo finishing equipment, for example, a printer, in the direction of the arrow 15. The trailing end of film 10 has the highest number film 16, for example, exposure 24 of a 24 exposure 35 mm film, shown with normal scene orientation of the image 17. This trailing end is spliced to the leading end of film 12 which shows the lowest numbered frame 18, for example, exposure 1 of a 24 exposure 35 mm film, with inverted scene orientation of the image 19. The splicing label is adhesively attached to the ends of the film to join them together by means of an automatic splicing machine, for example, the Ultima Day Light Splicer, manufactured by Standard Manufacturing of Chicopee, Mass.

A tape of film-splicing labels, coated with heat activated adhesive on one side, is fed to a splicer where contact is made with adjacent rolls of film under the splice head. Pressure and heat is used to adhesively attach the label to the adjacent rolls of film. The temperature of the splice head is preferably about 350° F. (177° C.). The adhesive is compatible with subsequent developing and imaging operations. Such labels are usually provided with a preprinted machine readable and/or eye readable code, for example, a sequential bar code 20 or an eye readable number 21. Such codes can be used to automatically correlate the film with the customers envelope number so that the processed film and prints can be matched after printing is completed. The spliced together filmstrips then go to a film developer which develops the exposed frames. The developed films are then supplied to the appropriate imaging equipment, for example, a printer.

The film-splicing label 14 can be further encoded and used to identify the film 12 as a right hand load film by any suitable means which can signal a compatible printer with the information and activate the parameters, such as the exposure determining algorithms in the printer software, to expose for an inverted image. Conversely, the label can be encoded for left hand load film if the next succeeding film in a roll of spliced films is left hand load and thus signal to the printer for a normal image. Any machine-readable or optical-readable coding system can be used which is compatible with the equipment used for splicing, developing and printing.

The film-splicing label can also be encoded and used to signal automatic digital imaging equipment to activate the parameters for the correct scene orientation.

In a preferred embodiment of the invention the scene orientation code is added to the film-splicing label immediately following the splicing step. Printing high resolution indicia such as bar codes or number sequences on the film-splicing label in the splicer would require expensive printing and scanning equipment to provide the printing quality and reading capability needed for reliably reading the code at the high through put speeds encountered during the splicing operation. A low resolution, robust encoding method requiring inexpensive printing and reading equipment for providing high speed printing and reliably reading the code is provided by modifying known automatic print count code (APC) systems to automatically signal the scene orientation of an exposed filmstrip to imaging equipment.

Normally operators of film-splicing and imaging equipment, for example, a printer, sort the customer's film into batches with the same print count requirements, e.g., all single prints or all double prints, and program the printer accordingly. Systems are well known which allow the operator to encode the film-splicing label with an APC code which signals the printer the number of prints required for each strip of film. For efficiency, coding for a print count is normally done with separated, large batches of film with the same print count requirements. However, it can readily be used with mixed batches of film with different print count requirements.

One such system for 35 mm color film is the Kodak Splice Print Count Reader which is installed on a Kodak 2610 Color Printer or Kodak 3510 Color Printer (all manufactured by Eastman Kodak Co., Rochester, N.Y.) and used in conjunction with the Ultima Day Light Splicer. This system requires that the printer be set for first-frame-first operation. This system performs the function of adjusting the number of prints per frame exposed by the printer for a particular customer order. This eliminates the need for the photo finisher to segregate his 1-, 2-, 3-, and 4-each orders and multi-print orders can flow through with normal orders.

In general, the APC code is under-utilized because most people require only 1 or 2 prints, not 3 or 4 prints. It is an object of this invention to utilize the APC code to indicate normal or inverted scene orientation by modifying the code and setting the parameters to encode for orientation and/or print count.

The film-splicing label for use with this invention is provided with an area reserved for adding an APC code in the splicer which is normally used to signal to a printer the number of prints of each frame which are required for the succeeding strip of film. Such a label can also carry additional preprinted codes as described above.

Figure 2:
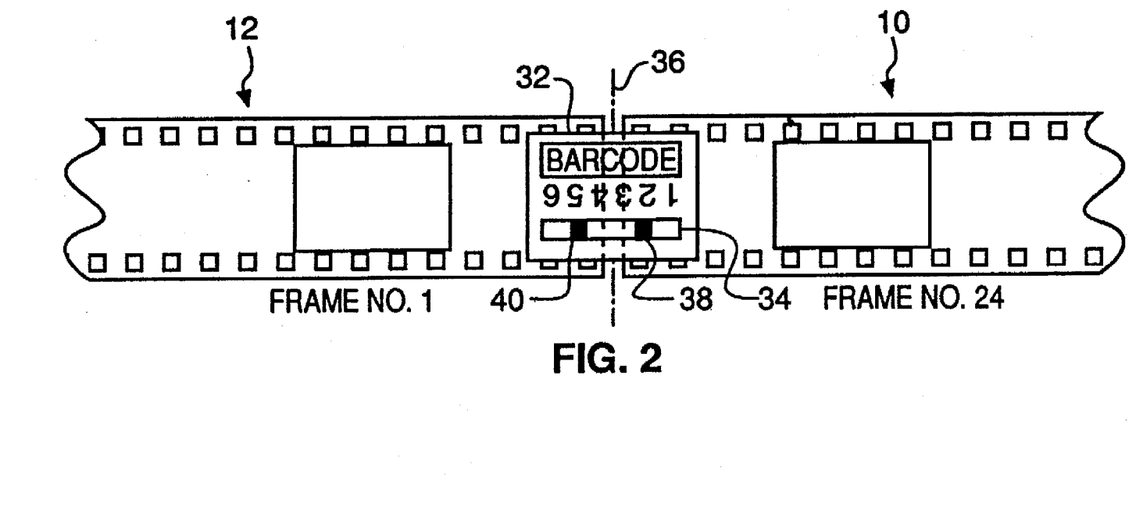
FIG. 2 illustrate a film-splicing label encoded with automatic print count (APC) information.

Referring to FIG. 2, there is shown a preferred method of coding for scene orientation in which a film-splicing label 32 joins a first film 10 and a second film 12 together. The APC code is located on a nominal print area 34 of the label and is automatically centered on the mid-point 36 between the last frame of the first film and the first frame of the second film and is utilized to encode for the scene orientation of the second film. Such films are usually contained in a large multi-film roll of spliced films which can be continuously and rapidly fed to an automatic printer. The printer senses the code for each label and activates the algorithms in the printer software for the selected scene orientation.

The APC code is all operator selected binary, two dot code placed on the film-splicing label when the splice is made. It consists of the area 34 which can be scanned for the presence or absence of a pattern of relatively large, low resolution indicia, for example, dark dots or rectangular patches. The specific locations for the dots are established by convention and are made at, for example, locations 38, 40, on either side of and equidistant from the mid-point of the film-splicing label. Such low resolution indicia have a minimum size for detection by a reader and a maximum for fitting in the allotted area of the splicing label, for example, between about 0.05 in. (1.25 mm) square and about 0.375 in. (9.5 mm) square.

The code is imprinted on the film-splicing label by a printer such as an impact printer, for example, a dot matrix printer, which can imprint a dark dot or rectangular patch of sufficient density and dimensions as required for sensing by an optical reader. Such a reader is installed in the Kodak Splice Print Count Reader and requires the difference in visual density between the indicia and splice tape to equal or exceed 0.5 on a visual scale.

Typically the labels are provided in the form of a splice tape of a standard width, for example, 0.5 in. (13 mm), 0.75 in. (1.9 mm) or 1 in. (25 mm) In a 1 in. (25 mm) wide label the area 34 measures, for example, 0.8 in. (20 mm) wide by 0.09" (2.3 mm) high and each rectangular patch measures 0.1 in. (2.5 mm) wide by 0.09 in (2.3 mm) high.

Figure 3:
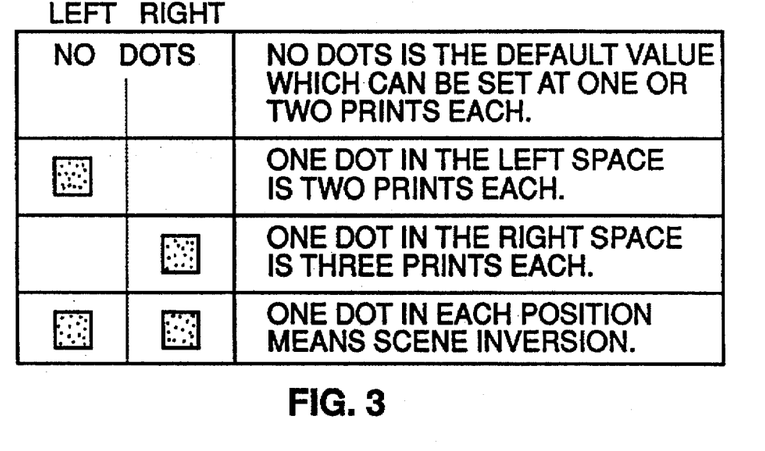
FIGS. 3, 4 and 5 are illustrations of alternative scene orientation codes.
Figure 4:
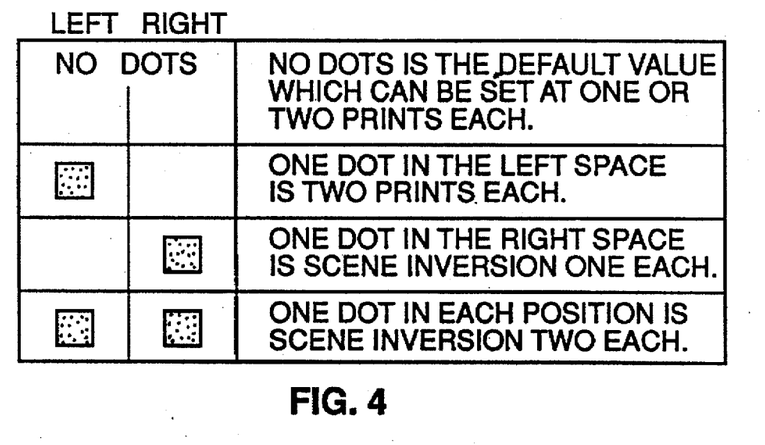
Figure 5:
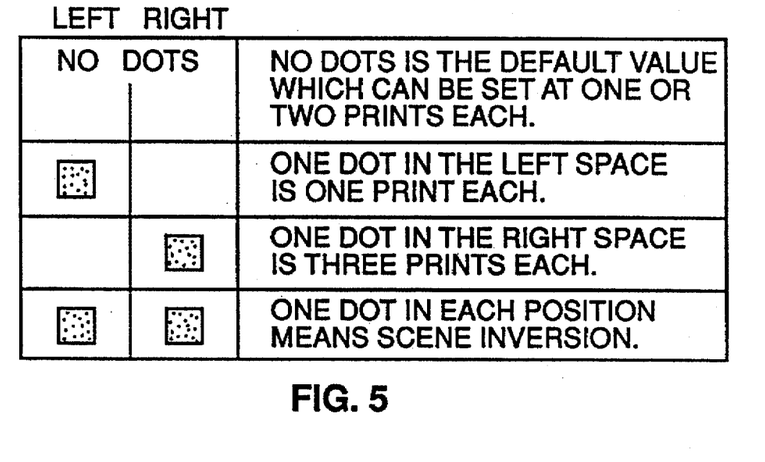

FIGS. 3, 4 and 5 illustrate three of several different patterns that can be used for the scene inversion code together with the print count requirement.

In FIG. 3, the absence of any dots is the default value which can be set so that the print count is one or two prints each. One dot in each position sets the printer for scene inversion. By setting the default value to one print each the scene inversion code will automatically print one print each. By setting the default value to two prints each, the scene inversion code will automatically print two prints each. In this version of the code, one dot on the left space will print two prints each for normal scene orientation, one dot in the right space will print three prints each for normal scene orientation, and depending on the setting of the default value, no dots will print one or two prints for normal scene orientation.

In FIG. 4, the absence of any dots is the default value which can be set so that the print count is one or two prints each. One dot in each position sets the printer for scene inversion and two prints each. In this version of the code, one dot on the left space will print two prints each for normal scene orientation, one dot in the right space will print one print each for scene inversion and depending on the setting of the default value, no dots will print one or two prints for normal scene orientation.

In FIG. 5, the absence of any dots is the default value which can be set so that the print count is one or two prints each. One dot in each position sets the printer for scene inversion. By setting the default value to one print each the scene inversion code will automatically print one print each. By setting the default value to two prints each, the scene inversion code will automatically print two prints each. In this version of the code, one dot on the left space will print one print each for normal scene orientation, one dot in the right space will print three prints each for normal scene orientation, and depending on the setting of the default value, no dots will print one or two prints for normal scene orientation.

The invention is not limited to these patterns of dots as various other patterns can be envisaged by those skilled in the field and used for specific demands.

Figure 6:
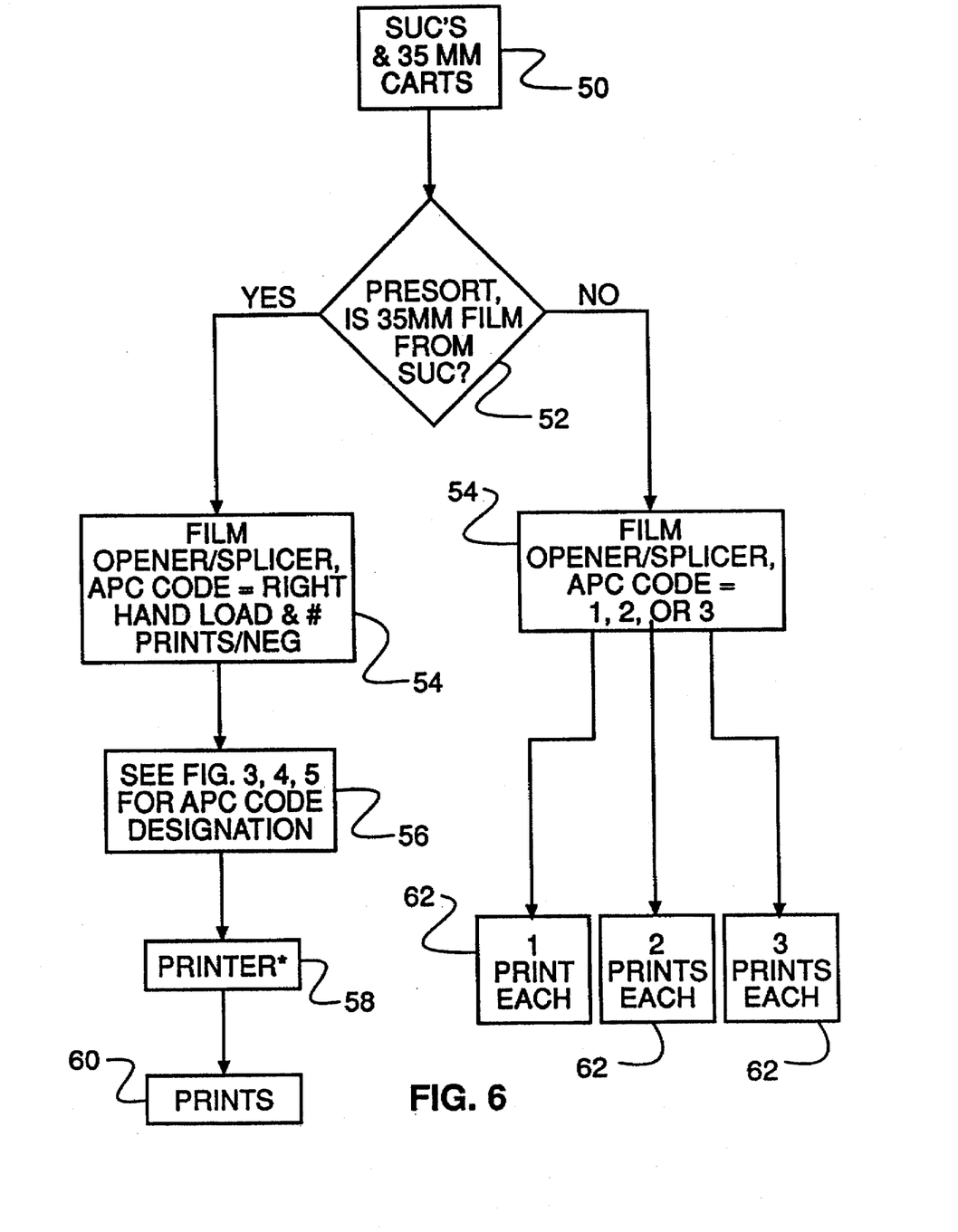
FIG. 6 is a block diagram of the control system (logic flowchart) for scene inversion detection.

Referring now to FIG. 6, a block diagram of a typical control system (logic flowchart) for sorting of films for scene inversion detection is shown. Film magazines film 35 mm left hand load cameras and 35 mm right hand load SUC cameras are collected in carts 50 and presorted into separate carts or bins 52 for each type of film. SUC films requiring scene inversion are selected and sent to a film opener/splicer 54 where each film is extracted and spliced to another film by adhesively attaching a film-splicing label adjacent to the first numbered frame of the SUC film and the last numbered frame of the other film. The label is then encoded with the APC code for scene inversion and prints per negative by a printer according to the designated pattern 56 (see FIGS. 3, 4 and 5). The roll of spliced films formed by splicing successive films is fed to a printer/reader 58 which senses the APC code, activates the algorithms in the printer software for scene inversion and prints the selected number of prints 60. Non-SUC or normal left hand load films are selected and sent to the film/opener splicer 54 where each film is extracted and spliced to another film by adhesively attaching a film-splicing label adjacent to the first numbered frame of the normal film and the last numbered frame of the other film. The label is then encoded with the APC code for the selected number of prints to be printed 62, for example, 1, 2 or 3 prints, with normal scene orientation.

This invention can also be used for other types of photo finishing equipment, for example, automatic digital imaging applications, such as the production of compact discs containing photographic images, and index prints on such discs, digitally or conventionally printed automatic album pages, etc., which also require that the images be correctly oriented before the final output image format is generated. It is envisaged also that this invention can be used with non-magazine loaded types of film.

According to this invention there is provided a system which can be used with automatic photo finishing equipment for printing multiple rolls of film and automatically sensing the scene orientation of each film. This invention provides an advantageous method for a photo finisher to control and provide optimal print exposure parameters for the correct scene orientation. This is achieved by encoding a film-splicing label with an APC code pattern selected to indicate whether successive lengths of spliced film have normal or inverted scene orientation. Existing photo finishing equipment can be readily adapted to use this method and increased print quality and productivity is achieved. As SUC's become more prevalent in the market place, indication of the film scene orientation becomes more valuable.

In addition to being able to supply information regarding the scene orientation, the APC code may be used by the photofinishing equipment to enable other parameters or functions to automatically be implemented. For example, the APC codes may be used to provide information to enable the addition of sound to the developed prints. As is disclosed in U.S. Pat. No. 4,974,096, information may be magnetically recorded on a thin magnetic transparent layer provided on the film to be developed. In the embodiment illustrated, sound or instructional information captured on the magnetic layer with respect to a particular image is read from the film by an appropriate magnetic head. During the printing of the images from the film onto the photographic sensitive paper, the instructional information or sound present on the film is used by the printer (or other photofinishing equipment) to provide sound on a sound playing device to be associated with the appropriate developed print. The placement of the dots in the APC code as set forth in FIGS. 7 and 8 allows various patterns that can be used to indicate whether or not sound is to be added to the developed print. If sound is to be added, the photofinishing equipment is provided with appropriate means for adding sound on to a sound device to be provided with the appropriate print. U.S. Pat. Nos. 4,541,028; 4,791,741; 5,365,686 and 5,433,035 disclose various sound playing devices that provide sound and can be associated with the prints. In the particular embodiment illustrated, the sound to be recorded on the sound playing device was originally recorded on the magnetic layer on the film. However, the present invention is not so limited. For example, various different sound flags can be recorded on the film, wherein each sound flag is representative of a preprogrammed sound to be recorded on the sound playing device by the printer or other appropriate device.

Figure 7:
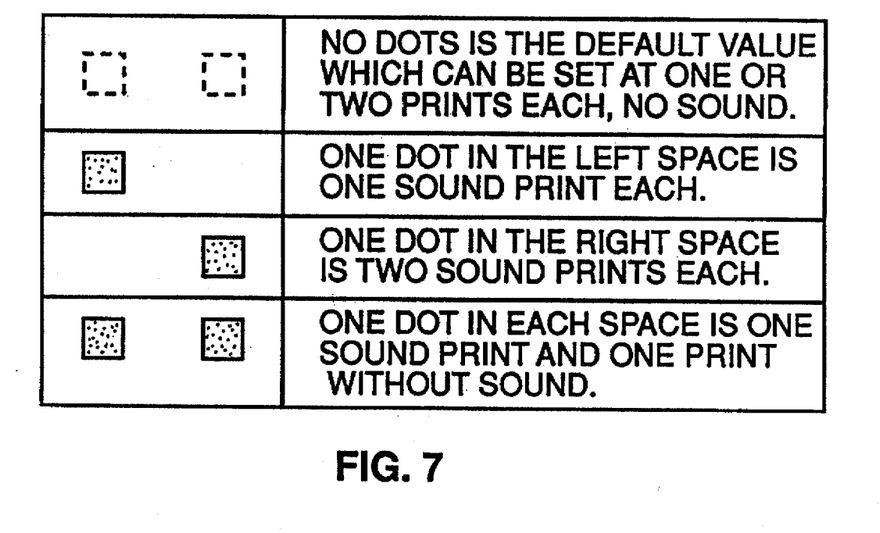
FIGS. 7 and 8 illustrate various other instructional codes.

In FIG. 7, the absence of any dots is the default value which can be set so that the print count is one or two prints each and no sound. One dot in each position sets the printer for sound print and one print without sound. One dot on the left space will print one sound print each. One dot in the right space will print two sound prints each.

Figure 8:
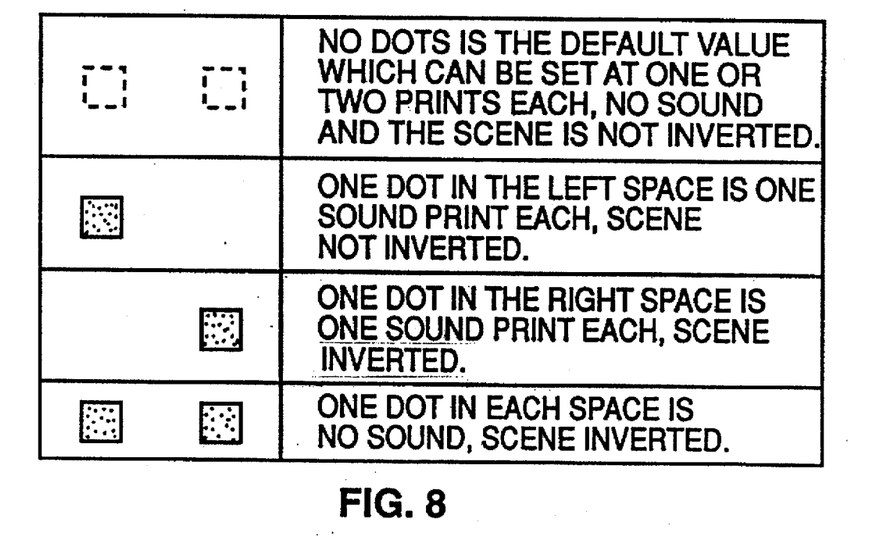

In FIG. 8, the absence of any dots is the default value which can be set so that the print count is one or two prints each, no sound and the scene is not inverted. One dot in each position sets the printer for scene inversion and no sound. One dot in the right space will provide one sound print each and the scene is inverted. One dot in the left position will provide one sound print each and will not invert the scene.

Figure 9:
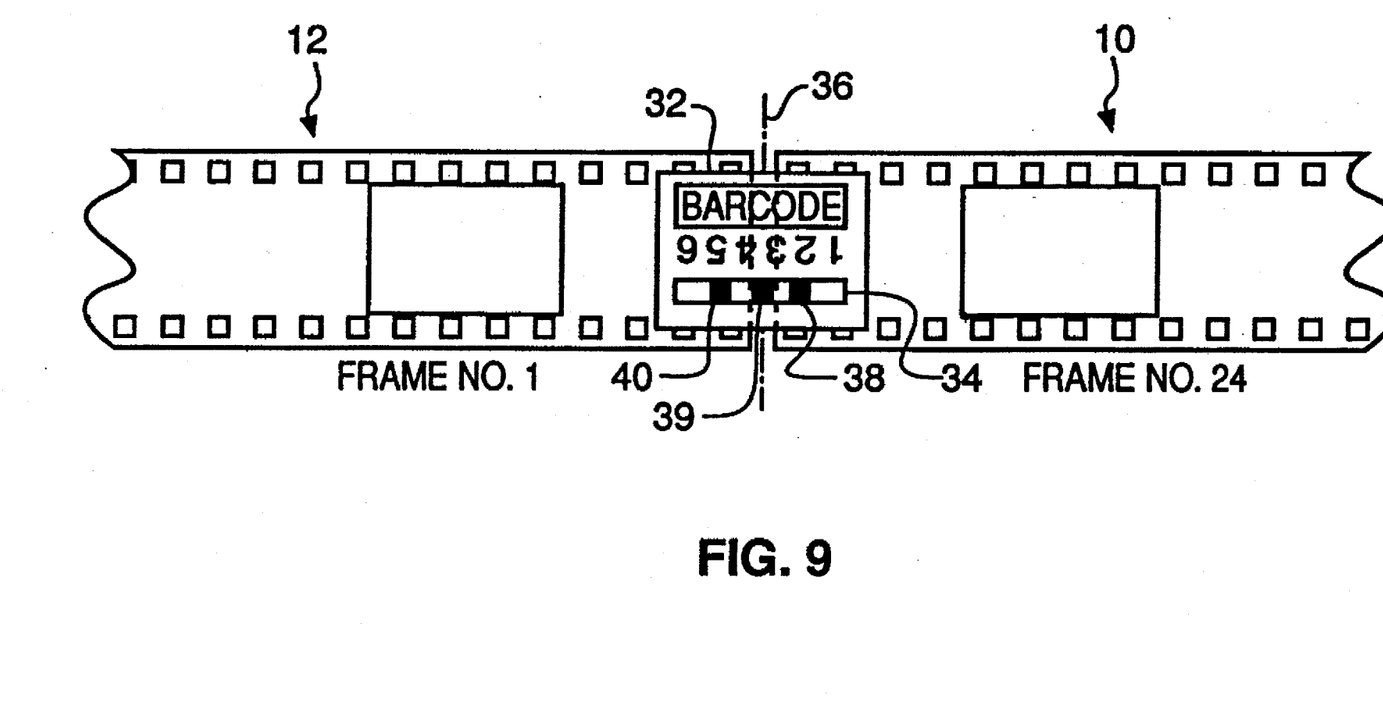
FIG. 9 illustrates a modified film-splicing label made in accordance with the present invention.

As can be seen from the foregoing, at least two process requirements can be provided to the photofinishing equipment by the APC code, for example, instructional information as to whether or not two or more prints are to be provided, information regarding the scene orientation, or whether or not sound is to be added to the print order. However, the present invention is not limited to supplying only two types of instructional information. If desired, more than two types of information may be provided on the APC code by the use of additional dots. For example, if information regarding the number of prints, scene orientation, and whether or not the addition of sound is to be supplied to the developed prints, may be coded on the film-splicing label 132 as illustrated in FIG. 9. The label 132 is similar to the label 32 of FIG. 2, like numeral indicating like parts. In this embodiment, a three dot code is used. In particular, dots are placed at locations 38, 39, and 40. These dots are formed and read in the same manner as previously discussed.

Figure 10:
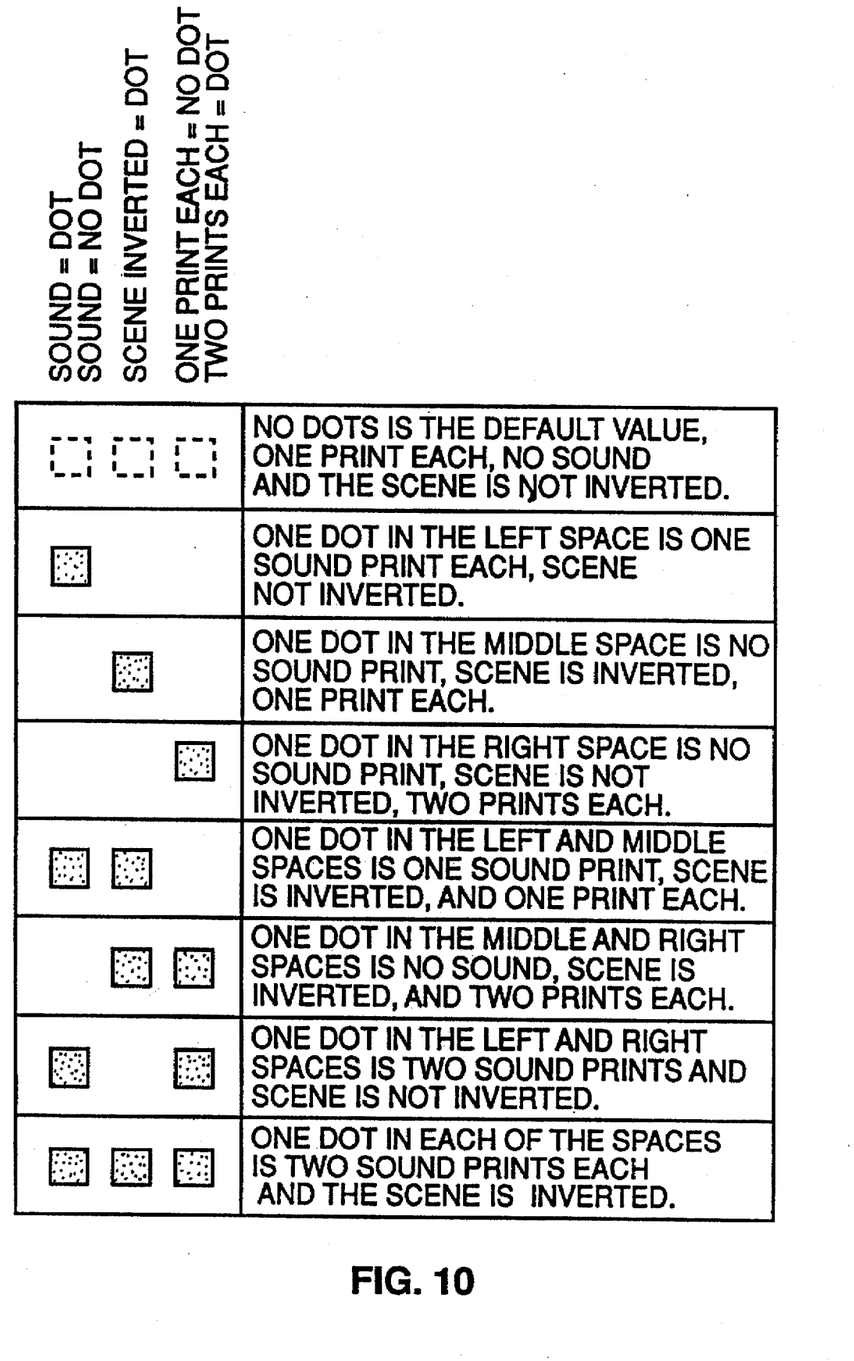
FIG. 10 illustrates a modified instructional code in accordance with the present invention.

Referring to FIG. 10, there is illustrated various patterns for a three dot system identifying specific demands. No dots is the default setting which prints one print each, no sound, and the scene is not inverted. One dot in each position provides two sound prints each and the scene is inverted. One dot in the left position provides one sound print each and the sound is not inverted. One dot in the center location provides no sound prints, the scene is inverted and one print each. One dot at the right location provides no sound prints, no scene inversion and two prints each. One dot in the center and left location provides one sound print, the scene is inverted and one print each. Dots in the center and the right locations provide no sound, the scene is inverted and two prints. A dot in the left and right locations provide two sound prints and the scene is not inverted.

Figure 11:
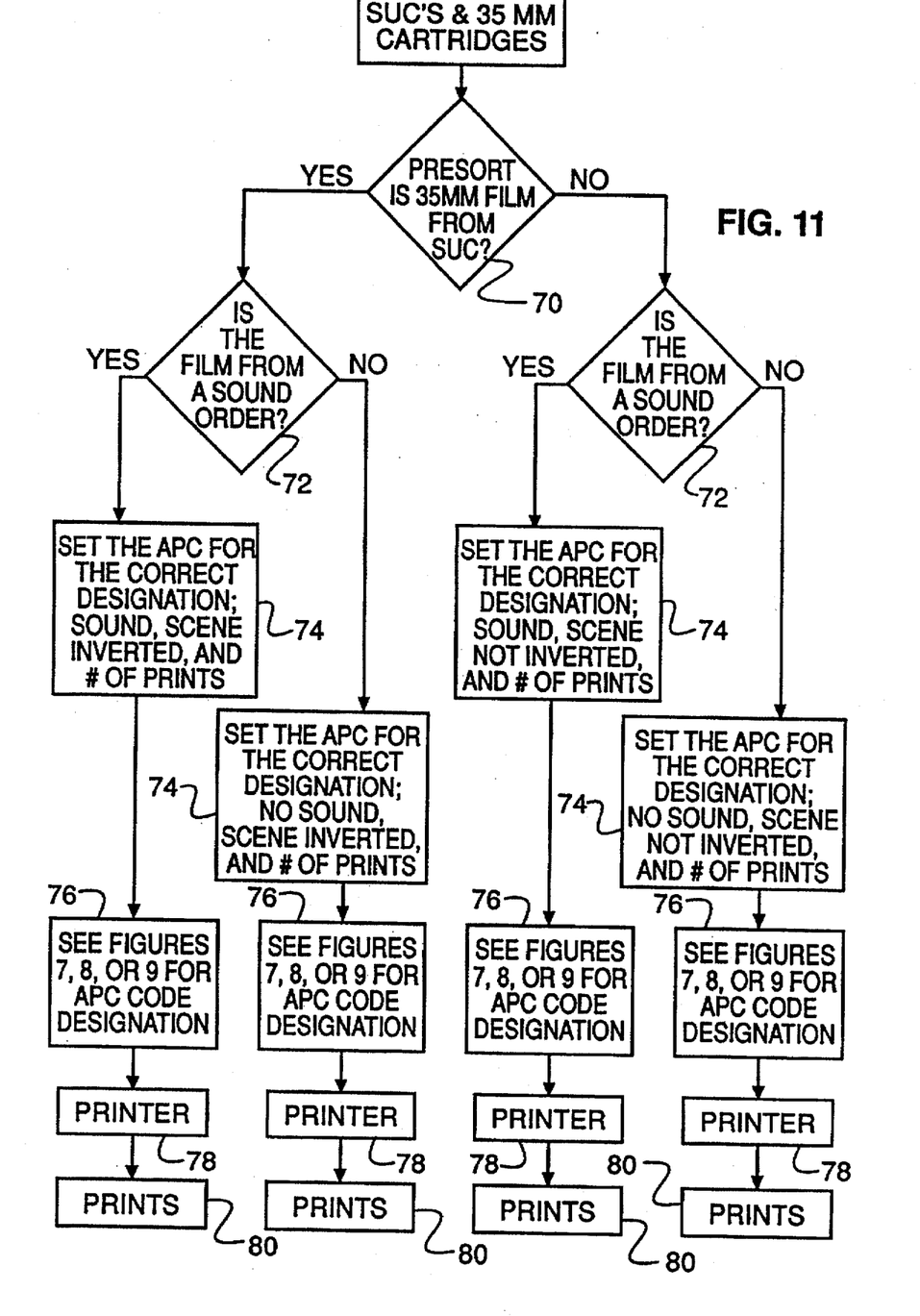
FIG. 11 is a block diagram of the code of FIG. 10.

Referring to FIG. 11, a block diagram similar to that of FIG. 6, is illustrated for sorting of film for scene inversion and sound order detection. Film is first sorted at box 70 for presence of single use cameras or typical 35 mm film. If yes than the 35 mm film at box 72 is sorted for the presence of a sound order. Sound orders go to box 74 where the APC code is provided. The code is read at box 66 and the printer at box 78 prints the order producing the prints at box 80. If no sound is present at box 72 the order is passed to box 74 where the different APC is applied to the splice-label. The order then goes to the printer box 76 where appropriate prints at box 76 are produced. If the film is a sound order, a similar path is followed except that the appropriate codes and functions are provided by the splicer and printer.

While the invention has been described in connection with the above described embodiments, those skilled in the art will recognize that many modifications and changes may be made therein without departing from the true spirit and scope of the invention, which accordingly is intended to be defined solely by the appended claims.

PARTS LIST

10 . . . first film
12 . . . second film
14 . . . film-splicing label
15 . . . arrow
16 . . . highest number frame
17,19 . . . image
18 . . . lowest numbered frame
20 . . . bar code
21 . . . eye readable number
1,24 . . . exposure
32,132 . . . film-splicing label
34 . . . print area
36 . . . mid-point
38,39,40 . . . locations
50 . . . carts
52 . . . bins
54 . . . opener/splicer
56 . . . designated pattern
58 . . . printer/reader
60 . . . prints
62 . . . prints to be printed
70,72,74,76,78,80 . . . boxes

What is claimed is:

1. A method for communicating two process order features to photofinishing equipment to enable two feature parameters to be performed automatically by the photofinishing equipment, comprising the steps of:

splicing the trailing end of a first exposed strip of film to the leading end of a second exposed strip of film with a film-splicing label; and encoding said film-splicing label with a code for two order features that are to be performed with respect to one of said exposed strip of photographic film.

2. A method according to claim 1, further comprising the step of:

feeding said spliced first and second films to a splicing label reader for reading said code and automatically setting the parameters for the addition of sound to the prints.

3. A method according to claim 2, further comprising the step of:

setting the parameters of a photographic printer for the addition of sound to the print.

4. A method according to claim 2, further comprising the step of:

setting the feature for adding of sound to the print for digital imaging applications.

5. A method according to claim 1, further comprising the step of:

encoding the film-splice label with a print count code for automatically adjusting the number of prints per frame to be exposed by a printer.

6. A method according to claim 5, further comprising the step of:

encoding the film-splice label with a print count code for automatically setting the scene orientation.

7. A method for communicating the requirements for the addition of sound to photofinishing equipment to enable the photofinishing equipment to add sound to developed prints, comprising the steps of:

splicing the trailing end of a first exposed strip of film to the leading end of a second exposed strip of film with a film-splicing label; and encoding said film-splicing label with a code for signifying the addition of sound to prints made from the exposed film.

8. A method according to claim 7, further comprising the step of:

encoding the film-splicing label with a print count code for automatically adjusting the number of prints per frame to be exposed by a printer.

9. A method according to claim 8, further comprising the step of:

feeding said splice first and second film-splicing label for reading said code and automatically adding sound to the prints made from said film.

* * * * *